(12) United States Patent
Harvey

(10) Patent No.: US 7,980,345 B1
(45) Date of Patent: Jul. 19, 2011

(54) DETACHABLE FOOTREST FOR A VEHICLE

(76) Inventor: Matthew C. Harvey, Celeste, TX (US)

( * ) Notice: Subject to any disclaimer, the term of this patent is extended or adjusted under 35 U.S.C. 154(b) by 30 days.

(21) Appl. No.: 12/565,338

(22) Filed: Sep. 23, 2009

(51) Int. Cl.
 *B60N 3/06* (2006.01)
 *B62D 25/20* (2006.01)
 *B62J 25/00* (2006.01)
 *G05G 1/60* (2008.04)

(52) U.S. Cl. ............ 180/90.6; 74/564; 280/291; 296/75

(58) Field of Classification Search ............... 74/564; 180/90.6; 280/291; 296/75
See application file for complete search history.

(56) References Cited

U.S. PATENT DOCUMENTS

| | | | | |
|---|---|---|---|---|
| 1,467,976 | A | * | 9/1923 | Gannon ............ 280/166 |
| 4,728,121 | A | * | 3/1988 | Graves ............ 280/748 |
| 4,768,799 | A | * | 9/1988 | Millican ........... 280/291 |
| 4,973,082 | A | * | 11/1990 | Kincheloe ......... 280/756 |
| 6,042,148 | A | * | 3/2000 | Howell ............ 280/827 |
| 6,224,134 | B1 | * | 5/2001 | Johnson et al. ..... 296/75 |
| 6,270,106 | B1 | * | 8/2001 | Maki et al. ........ 280/291 |
| 6,719,316 | B1 | * | 4/2004 | Anthony ........... 280/291 |
| 7,431,118 | B1 | * | 10/2008 | Hogg .............. 180/219 |
| 2009/0302569 | A1 | * | 12/2009 | Schemp ............ 280/291 |

OTHER PUBLICATIONS

Jim Bacon, Diamond T-D Products, Aug. 21, 2009, www.jeepspeak.com/footpegs.asp.

* cited by examiner

*Primary Examiner* — Toan C To
*Assistant Examiner* — Laura Freedman
(74) *Attorney, Agent, or Firm* — Michael Diaz

(57) ABSTRACT

A detachable footrest for use on a vehicle. The footrest has a surface area sized and shaped to accommodate a foot of a user and at least one support arm attached to a support structure. The footrest also includes two downward projections projecting from the support structure. The downward projections are sized and shaped to fit within hinge mounts of a removed door of the vehicle. The projections are slid into the hinge mounts of the removed door of the vehicle, thereby providing a surface area outside of the vehicle for resting the foot of the user. The footrest may also include a stabilizer projecting from the support structure and fastened to a mounting post located in an interior of the vehicle.

18 Claims, 4 Drawing Sheets

DETACHABLE FOOTREST FOR A VEHICLE

BACKGROUND OF THE INVENTION

1. Field of the Invention

This invention relates to accessories for vehicles. Specifically, and not by way of limitation, the present invention relates to a footrest for attachment to a side portion of a vehicle.

2. Description of the Related Art

Off-road vehicles are quite popular. These vehicles enable a driver to experience driving in its most basic and rustic form where paved roads are not always utilized. Furthermore, these vehicles oftentimes include detachable doors and roofs to enable the driver and any passengers to enjoy the outside environment. The driver is able to enjoy the open air while traveling, whether off-road or on the road. However, there are some disadvantages to removing the door. First, a side mirror is typically attached to the door, so when the door is removed, the mirror is also removed. Second, drivers and passengers, with doors removed, often have an urge to have their limbs outside of the vehicle cab. For example, the driver may wish to stretch his left leg out upon the side of the vehicle. However, there typically is no safe place to position the driver's or passenger's leg outside the vehicle cab.

There are various foot pegs which are affixed to vehicles. However, these existing foot pegs fail to provide a sufficient planar surface area to allow a stable resting platform for the user's foot. Furthermore, none of the existing pegs are attached to the vehicle at more than one point. Thus, the existing pegs are subject to structural failure because of a lack of redundant attachment points. Furthermore, none of the existing foot pegs provide a stabilizer for stabilizing the foot peg against the vehicle and prevent undesirable movement of the foot peg. In addition, these existing pegs require tedious attachment means, such as nuts and bolts, and are not easily removed or attached to the vehicle.

Thus, it would be advantageous to have a footrest which is easily attached and removed from a side portion of a vehicle where a removed door previously occupied. It is an object of the present invention to provide such an apparatus.

SUMMARY OF THE INVENTION

The present invention is a detachable footrest for use on a vehicle. In one aspect, the present invention is directed to a detachable footrest for a vehicle. The footrest has a surface area sized and shaped to accommodate a foot of a user and at least one support arm attached to a support structure. The footrest also includes a first downward projection projecting from the support structure. The first downward projection is sized and shaped to fit within a first hinge mount of a removed door of the vehicle. The footrest also includes a second downward projection projecting from the support structure. The second downward projection is also sized and shaped to fit within a second hinge mount of the removed door of the vehicle. The first downward projection is slid into the first hinge mount of the removed door of the vehicle and the second downward projection is slid into the second hinge mount of the removed door of the vehicle, thereby providing a surface area outside of the vehicle for resting the foot of the user. The footrest may also include a stabilizer projecting from the support structure and fastened to a mounting post located in an interior of the vehicle. Additionally, the footrest may include a side mirror and an illumination device.

In another aspect, the present invention is directed to a footrest vehicle combination. The combination includes a vehicle having a first hinge mount and a second hinge mount for affixing a door to a side of the vehicle. The combination also includes a detachable footrest. The footrest includes a footrest having a surface area sized and shaped to accommodate a foot of a user and a support arm attached to a support structure. The foot rest also includes a first downward projection projecting from the support structure. The first downward projection is sized and shaped to fit within the first hinge mount of a removed door of the vehicle. Additionally, the footrest also includes a second downward projection projecting from the support structure. The second downward projection is sized and shaped to fit within the second hinge mount of the removed door of the vehicle. The first downward projection is slid into the first hinge mount of the removed door of the vehicle and the second downward projection is slid into the second hinge mount of the removed door of the vehicle, thereby providing a surface area outside of the vehicle for resting the foot of the user.

DESCRIPTION OF THE INVENTION

Figure 1:
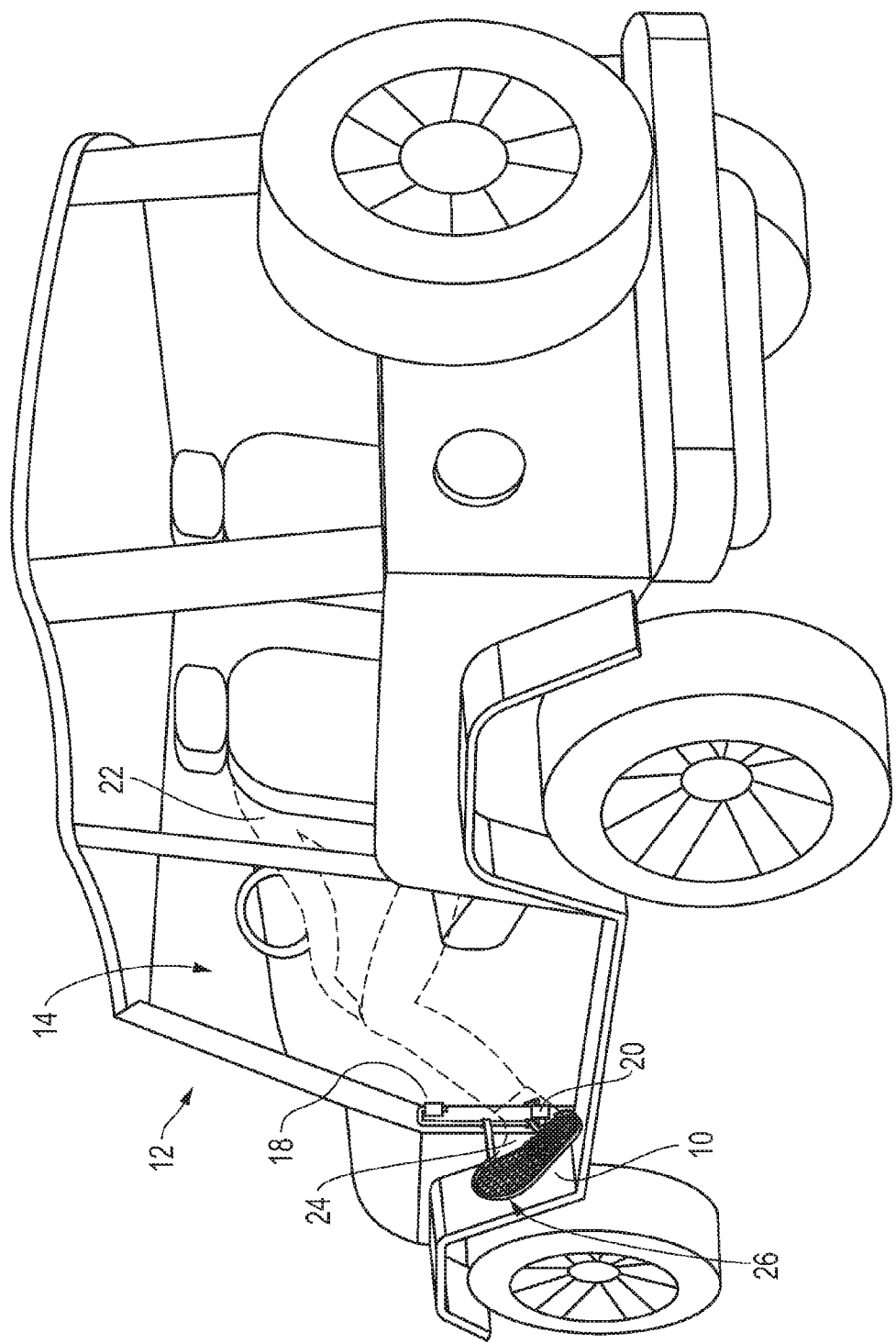
FIG. 1 is a rear perspective view of a left footrest attached to a vehicle in the preferred embodiment of the present invention.

The present invention is a footrest which is easily attached and removed from a side portion of a vehicle. FIG. 1 is a rear perspective view of a left footrest 10 attached to a vehicle 12 in the preferred embodiment of the present invention. The vehicle includes an opening 14 where a side door (not shown) is normally situated. Typically, the door is attached at upper hinge mount 18 and lower hinge mount 20. In the preferred embodiment of the present invention, the footrest 10 is attached at the upper and lower mounts 18 and 20. When driving, a driver 22 may rest a foot 24 upon a planar surface 26 of the footrest.

Figure 2:
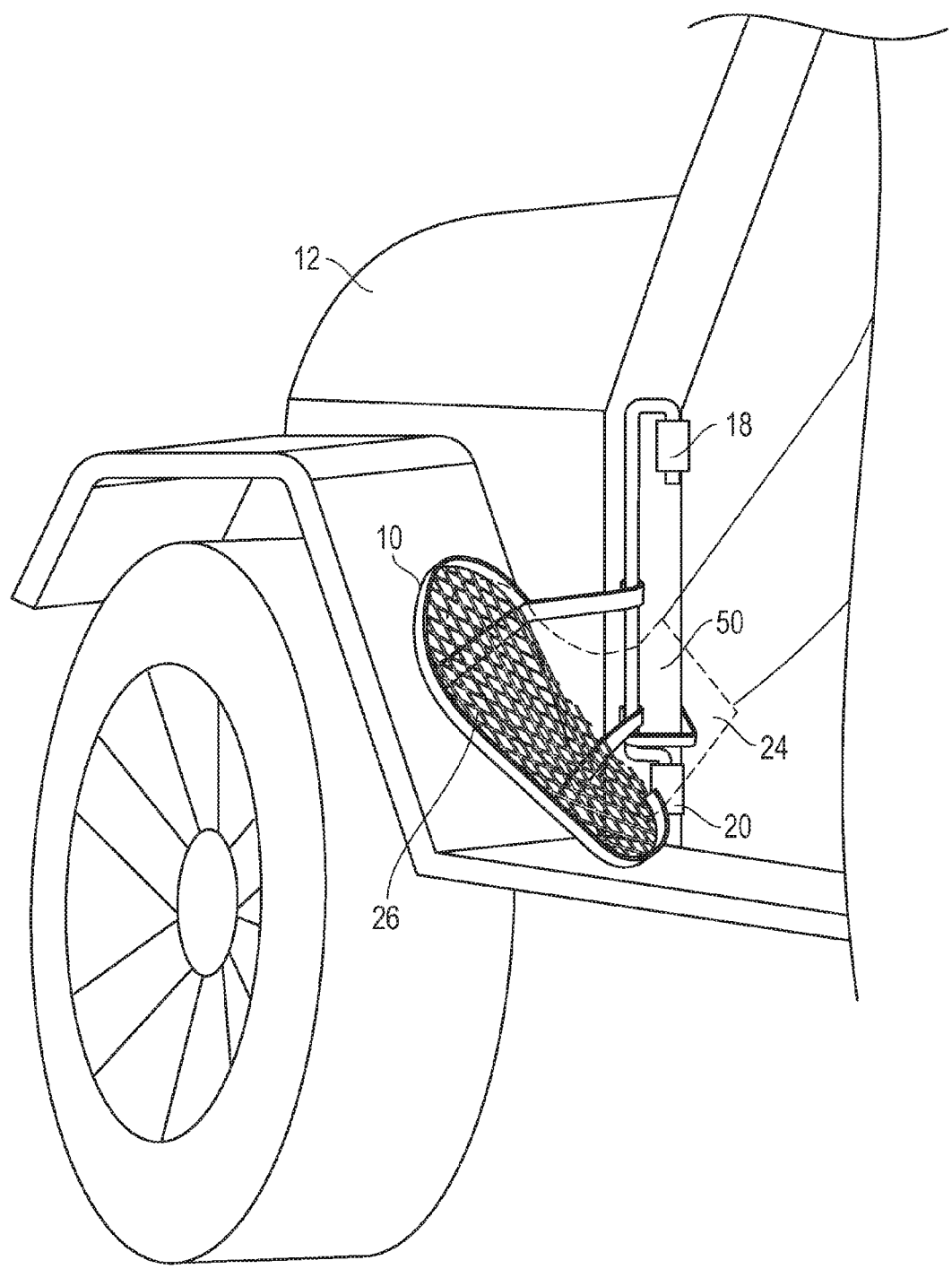
FIG. 2 is an enlarged side perspective view of the footrest attached to the vehicle of FIG. 1.

FIG. 2 is an enlarged side perspective view of the footrest 10 attached to the vehicle of FIG. 1. The upper hinge mount 18 and lower hinge mount 20 are typically cylindrical hinge structures having a bore running within the center of each mount. The door is normally affixed by support rods positioned within bores of each mount, thereby allowing the door to swing opened and closed.

Figure 3:
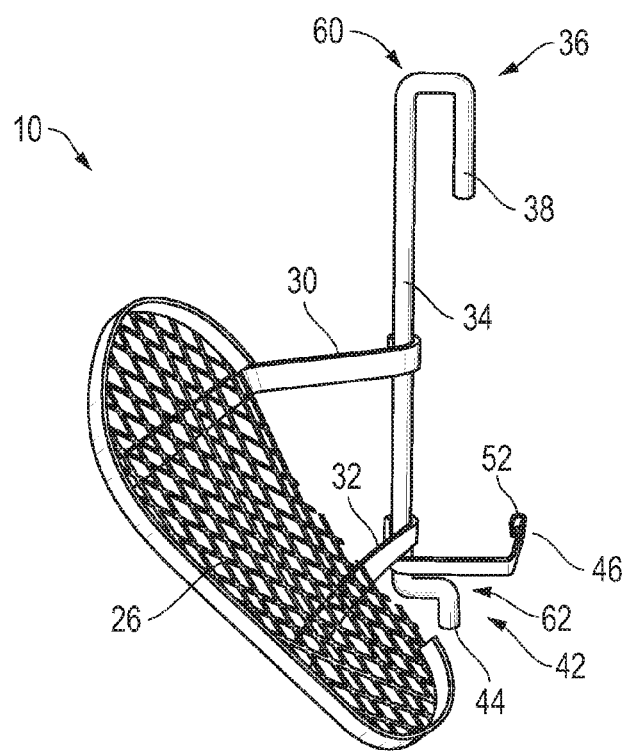
FIG. 3 is a side perspective view of the left footrest removed from the vehicle.

FIG. 3 is a side perspective view of the left footrest 10 removed from the vehicle 12. In the preferred embodiment, the footrest 10 includes support arms 30 and 32 attached to a support structure or rod 34. The rod 34 includes an upper end 36 having a downward projection 38. Opposite to the upper end 36 is a lower end 42 having a downward projection 44. The projections 38 and 44 are sized and shaped to fit within the bores of the upper and lower hinge mounts 18 and 20. Projecting inwardly toward the interior of the vehicle is an optional stabilizer 46. In the preferred embodiment of the present invention, the stabilizer 46 includes a perpendicular bend sized and shaped to fit against a vertical door jamb 50 (see FIG. 2) of the vehicle 12. The stabilizer 46 may include a hook end 52 which is sized and shaped to fit upon an inner mounting post 54 (see FIG. 5), often used for a door strap, located on an opposite inside side of the door jam.

In the preferred embodiment of the present invention, the footrest 10 includes the planar resting surface 26. The planar resting surface may be constructed of a mesh material or a solid, unbroken material. However, in other embodiments, the footrest may take any shape and size to enable a person's foot to rest upon the footrest. For example, the footrest may be a cylindrical peg. Furthermore, although the two support arms 30 and 32 provide substantial support for the footrest against the rod 34, the present invention may utilize one or more than two support arms shaped in any fashion to allow attachment and support upon the rod. Although the rod 34 is depicted as an elongated rod, the rod may take any shape which enables one or more support arms and the projections to be affixed upon.

In the preferred embodiment of the present invention, the upper end includes a 180 degree bend 60. The 180 degree bend of the upper end enables the downward projection 38 to easily be inserted or removed from the bore of the upper hinge mount. Furthermore, the lower end 42 preferably includes 90 degree bend 62 to enable ease in insertion and removal of the downward projection 44 into the lower hinge mount 20.

The footrest and support structure is preferably constructed of steel. However, the present invention may be constructed of any hard material, such as a composite material. The present invention may be utilized on any vehicle having a removable door, such as a Jeep® or Suzuki® off-road vehicle. The footrest may also be collapsible to allow easy storage of the footrest.

Figure 4:
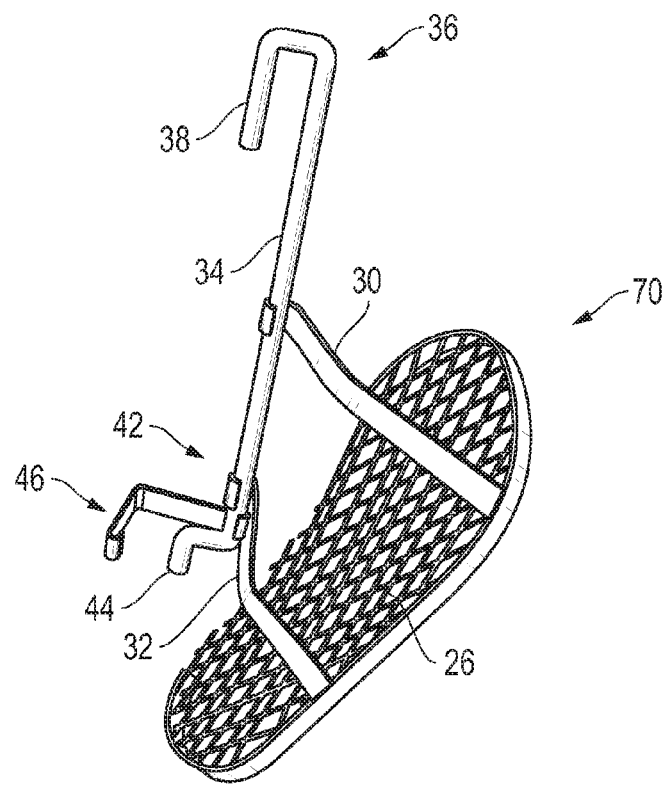
FIG. 4 is a side perspective view of a right footrest removed from the vehicle.

FIG. 4 is a side perspective view of a right footrest 70 removed from the vehicle 12. The right footrest may be used by a passenger located on a right side of the vehicle. The right footrest includes support arms 30 and 32, rod 34, upper end 36 having a downward projection 38, the lower end 42 having downward projection 44, and the stabilizer 46. However, the various components are orientated to be sized and shaped to accommodate placement upon the upper and lower hinge mounts located on the right side of the vehicle.

With reference to FIGS. 1-4, the operation of the footrest 10 will now be explained. One or both doors (not shown) are removed from the vehicle 12. The footrest 10 is attached to the vehicle by positioning the downward projection 38 into a bore of the upper hinge mount 18 of the vehicle and positioning the downward projection 44 into the lower hinge mount 20. The stabilizer 46 is positioned within the interior of the vehicle 12 through the opening 14 and rests upon an interior of the vehicle. Preferably, the hook end 52 is hooked upon the inner mounting post 54 located in the interior of the vehicle 12. With the door rest attached within the hinge mounts 18 and 20 and the inner mounting post 54, the door rest is securely fastened. The stabilizer enables the door rest to remain stable, thereby providing a stable platform for a foot to rest upon. When desired, the user may remove the footrest 10 by applying upward force upon the footrest to enable the downward projections 38 and 44 to slide out of the hinge mounts.

Figure 5:
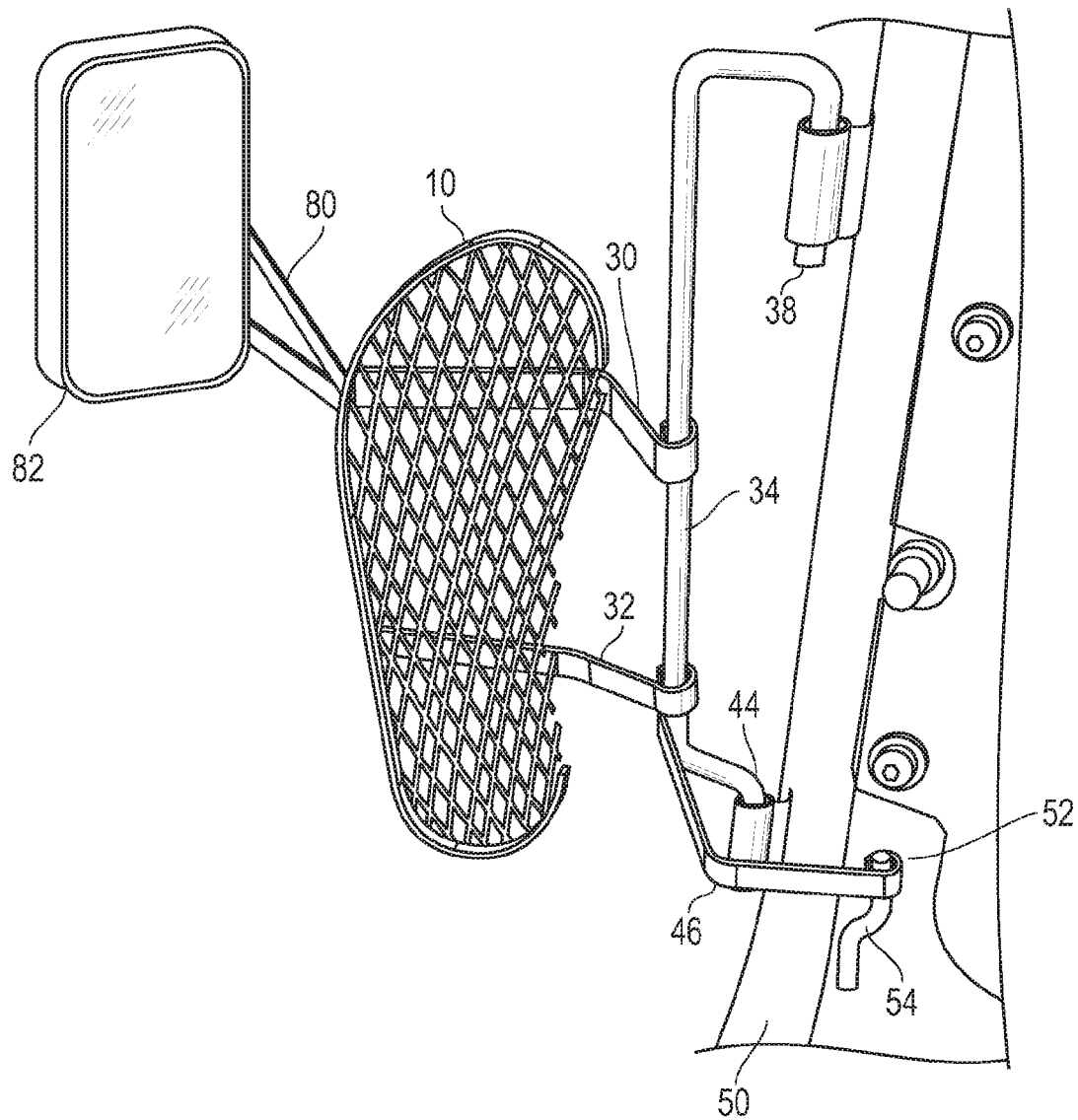
FIG. 5 is a rear perspective view of the footrest with a mirror in an alternate embodiment of the present invention.

FIG. 5 is a rear perspective view of the footrest 10 with a mirror 82 in an alternate embodiment of the present invention. The mirror may include one or more support arms 80 extending the mirror 82 from the footrest. Typically, side mirrors are mounted on the door. By removing the door, the side mirror is also removed. In this embodiment, the mirror performs the function of the side mirror. Since the mirror 82 extends outwardly from the footrest, in most cases, the mirror 82 is located further from the side of the vehicle then normal side mirrors, thereby providing enhanced rearward visibility than normal door-mounted side mirrors.

In an alternate embodiment of the present invention, the footrest or the mirror may include a light or other illumination device, such as a spot light, a fog light, or any type of signal light. Wiring from the light (not shown) may be attached to the support structure of the footrest and coupled to wiring located within the interior of the vehicle.

The present invention provides many advantages. The present invention enables easy removable and attachment of the footrest to a vehicle without the need for fastening devices such as nuts and bolts. The footrest provides a stable platform for resting a person's foot outside of the vehicle. Furthermore, the present invention may include a mirror to enhance rearward visibility. Additionally, an illumination device may be mounted upon the mirror or the footrest.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A detachable footrest for a vehicle, the footrest comprising:
   a footrest having a surface area sized and shaped to accommodate a foot of a user, the footrest having at least one support arm;
   a support structure, the support arm attached to the support structure;
   a first downward projection projecting from the support structure, the first downward projection sized and shaped to fit within a first hinge mount of a removed door of the vehicle; and
   a second downward projection projecting from the support structure, the second downward projection sized and shaped to fit within a second hinge mount of the removed door of the vehicle;
   wherein the first downward projection is slid into the first hinge mount of the removed door of the vehicle and the second downward projection is slid into the second hinge mount of the removed door of the vehicle, thereby providing a surface area outside of the vehicle for resting the foot of the user.

2. The detachable footrest according to claim 1 further comprising a stabilizer, the stabilizer projecting from the support structure and fastened to a mounting post located in an interior of the vehicle.

3. The detachable footrest according to claim 2 wherein the stabilizer includes a hook end for fastening onto the mounting post of the vehicle.

4. The detachable footrest according to claim 2 wherein the stabilizer includes a substantially 90 degree bend sized and shaped to lie flat against a door jamb of the vehicle.

5. The detachable footrest according to claim 1 wherein the footrest is a planar surface.

6. The detachable footrest according to claim 5 wherein the planar surface is constructed of a mesh material.

7. The detachable footrest according to claim 1 wherein the footrest is a peg.

8. The detachable footrest according to claim 1 further comprising a mirror affixed to the footrest.

9. The detachable footrest according to claim 1 further comprising an illumination device affixed to the footrest.

10. The detachable footrest according to claim 1 wherein the support structure is a rod.

11. The detachable footrest according to claim 1 wherein the footrest is collapsible.

12. A footrest vehicle combination, the combination comprising:
- a vehicle, the vehicle having a first hinge mount and a second hinge mount for affixing a door to a side of the vehicle;
- a detachable footrest having:
  - a footrest having a surface area sized and shaped to accommodate a foot of a user, the footrest having at least one support arm;
  - a support structure, the support arm attached to the support structure;
  - a first downward projection projecting from the support structure, the first downward projection sized and shaped to fit within the first hinge mount of a removed door of the vehicle; and
  - a second downward projection projecting from the support structure, the second downward projection sized and shaped to fit within the second hinge mount of the removed door of the vehicle;
- wherein the first downward projection is slid into the first hinge mount of the removed door of the vehicle and the second downward projection is slid into the second hinge mount of the removed door of the vehicle, thereby providing a surface area outside of the vehicle for resting the foot of the user.

13. The footrest vehicle combination according to claim 12 wherein the vehicle includes a mounting post locating in an interior of the vehicle and further comprising a stabilizer, the stabilizer projecting from the support structure and fastened to the mounting post located in an interior of the vehicle.

14. The footrest vehicle combination according to claim 13 wherein the stabilizer includes a hook end for fastening onto the mounting post of the vehicle.

15. The footrest vehicle combination according to claim 12 wherein the footrest is a planar surface.

16. The footrest vehicle combination according to claim 12 further comprising a mirror affixed to the footrest.

17. The footrest vehicle combination according to claim 12 further comprising an illumination device affixed to the footrest.

18. The footrest vehicle combination according to claim 12 wherein the footrest is collapsible.

* * * * *